US012693792B2

(12) United States Patent
Khadiwala et al.

(10) Patent No.: US 12,693,792 B2
(45) Date of Patent: *Jul. 28, 2026

(54) GENERATING A TRUSTED REBUILT APPENDED ENCODED DATA SLICE

(71) Applicant: Pure Storage, Inc., Santa Clara, CA (US)

(72) Inventors: Ravi V. Khadiwala, Bartlett, IL (US); Jason K. Resch, Warwick, RI (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/791,684

(22) Filed: Aug. 1, 2024

(65) Prior Publication Data

US 2024/0393960 A1 Nov. 28, 2024

Related U.S. Application Data

(63) Continuation of application No. 17/247,434, filed on Dec. 10, 2020, now Pat. No. 12,061,797, which is a
(Continued)

(51) Int. Cl.
G06F 11/16 (2006.01)
G06F 3/06 (2006.01)
(Continued)

(52) U.S. Cl.
CPC .......... G06F 3/0619 (2013.01); G06F 3/0608 (2013.01); G06F 3/0647 (2013.01);
(Continued)

(58) Field of Classification Search
CPC .... G06F 3/0619; G06F 3/0608; G06F 3/0647; G06F 3/067; G06F 3/0689; G06F 11/167; G06F 16/00; H04L 9/40; H04L 63/123
See application file for complete search history.

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Maher N Algibhah
(74) *Attorney, Agent, or Firm* — Katz Ruby & Carle LLP; Katherine C. Stuckman; Bruce E. Stuckman

(57) ABSTRACT

A method for execution by one or more computing devices includes generating current slice integrity check value information for a rebuilt appended encoded data slice of a set of appended encoded data slices stored in a set of storage units of the storage network, where an appended encoded data slice of the set of appended encoded data slices includes an encoded data slice of a set of encoded data slices and slice integrity check value information for the encoded data slice. The method further includes determining the current slice integrity check value information compares favorably to the slice integrity check value information to produce a trusted rebuilt appended encoded data slice. When the current slice integrity check value information compares favorably to the slice integrity check value information, the method further includes storing the rebuilt appended encoded data slice as the trusted rebuilt appended encoded data slice.

19 Claims, 7 Drawing Sheets

Related U.S. Application Data continuation of application No. 15/660,635, filed on Jul. 26, 2017, now Pat. No. 10,891,058, which is a continuation-in-part of application No. 15/082,887, filed on Mar. 28, 2016, now Pat. No. 10,402,122.

(60) Provisional application No. 62/168,145, filed on May 29, 2015.

(51) Int. Cl.
*H04L 9/40* (2022.01)
*G06F 16/00* (2019.01)

(52) U.S. Cl.
CPC ............ *G06F 3/067* (2013.01); *G06F 3/0689* (2013.01); *G06F 11/167* (2013.01); *H04L 63/123* (2013.01); *G06F 16/00* (2019.01)

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Vilkov | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 9,442,671 B1 | 9/2016 | Zhang et al. | |
| 9,489,254 B1 | 11/2016 | Franklin | |
| 9,766,810 B2 | 9/2017 | Baptist | |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters, III | |
| 2009/0094251 A1 | 4/2009 | Gladwin | |
| 2009/0094318 A1 | 4/2009 | Gladwin | |
| 2010/0023524 A1 | 1/2010 | Gladwin | |
| 2011/0314346 A1* | 12/2011 | Vas | H04L 9/3242 714/49 |
| 2012/0198066 A1 | 8/2012 | Grube | |
| 2013/0275844 A1* | 10/2013 | Thornton | G06F 3/064 707/652 |
| 2013/0283394 A1* | 10/2013 | Leggette | G06F 15/16 726/27 |
| 2014/0245063 A1 | 8/2014 | Baptist | |
| 2017/0048021 A1 | 2/2017 | Yanovsky | |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

(56)     References Cited

OTHER PUBLICATIONS

Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.
Zeilenga; Lightweight Directory Access Protocol (LDAP): Technical Specification Road Map; IETF Network Working Group; RFC 4510; Jun. 2006; pp. 1-8.

* cited by examiner distributed, or dispersed, storage network (DSN) 10

| SU #1 36 | SU #2 36 | SU #3 36 | SU #4 36 | SU #5 36 |
|---|---|---|---|---|
| SN 1_1 / EDS 1_1 | SN 2_1 / EDS 2_1 | SN 3_1 / EDS 3_1 | SN 4_1 / EDS 4_1 | SN 5_1 / EDS 5_1 |
| ● ● ● | ● ● ● | ● ● ● | ● ● ● | ● ● ● |
| SN 1_Y / EDS 1_Y | SN 2_Y / EDS 2_Y | SN 3_Y / EDS 3_Y | SN 4_Y / EDS 4_Y | SN 5_Y / EDS 5_Y | computing device 12 or 16 deslicing & error decoding data segment 1  ● ● ●  data segment Y combine data object 40 decoding matrix ($E^{-1}$) $*$ coded matrix (CM) $=$ data matrix (DM)

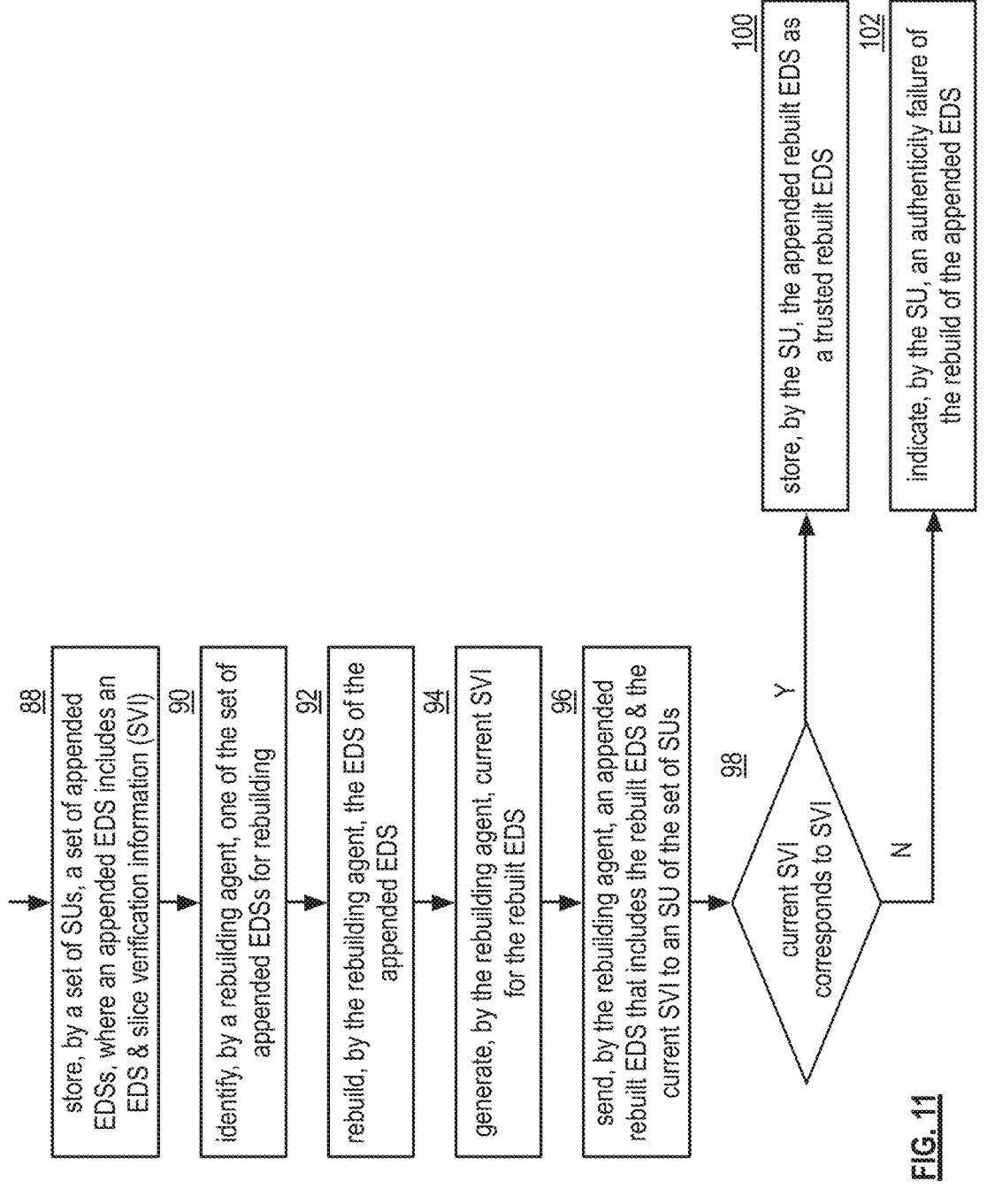

88 store, by a set of SUs, a set of appended EDSs, where an appended EDS includes an EDS & slice verification information (SVI)

90 identify, by a rebuilding agent, one of the set of appended EDSs for rebuilding

92 rebuild, by the rebuilding agent, the EDS of the appended EDS

94 generate, by the rebuilding agent, current SVI for the rebuilt EDS

96 send, by the rebuilding agent, an appended rebuilt EDS that includes the rebuilt EDS & the current SVI to an SU of the set of SUs

98 current SVI corresponds to SVI

Y

N

100 store, by the SU, the appended rebuilt EDS as a trusted rebuilt EDS

102 indicate, by the SU, an authenticity failure of the rebuild of the appended EDS

FIG. 11

GENERATING A TRUSTED REBUILT APPENDED ENCODED DATA SLICE

CROSS REFERENCES TO RELATED PATENTS

The present U.S. Utility Patent application claims priority pursuant to 35 U.S.C. § 120 as a continuation of U.S. Utility application Ser. No. 17/247,434, entitled "VERIFIABLE REBUILDING OF AN APPENDED ENCODED DATA SLICE," filed Dec. 10, 2020, which is a continuation of U.S. Utility application Ser. No. 15/660,635, entitled "ENCODING SLICE VERIFICATION INFORMATION TO SUPPORT VERIFIABLE REBUILDING," filed Jul. 26, 2017, issued as U.S. Pat. No. 10,891,058 on Jan. 12, 2021, which is a continuation-in-part of U.S. Utility application Ser. No. 15/082,887, entitled "TRANSFERRING ENCODED DATA SLICES IN A DISPERSED STORAGE NETWORK," filed Mar. 28, 2016, issued as U.S. Pat. No. 10,402,122 on Sep. 3, 2019, which claims priority pursuant to 35 U.S.C. § 119(e) to U.S. Provisional Application No. 62/168,145, entitled "TRANSFERRING ENCODED DATA SLICES BETWEEN STORAGE RESOURCES," filed May 29, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage. It is also known that unauthorized devices may attempt to corrupt data within a dispersed storage network. Data verification procedures prevent data corruption during data rebuilding functions.

BRIEF DESCRIPTION OF THE SEVERAL VIEWS OF THE DRAWING(S)

Figure 9:
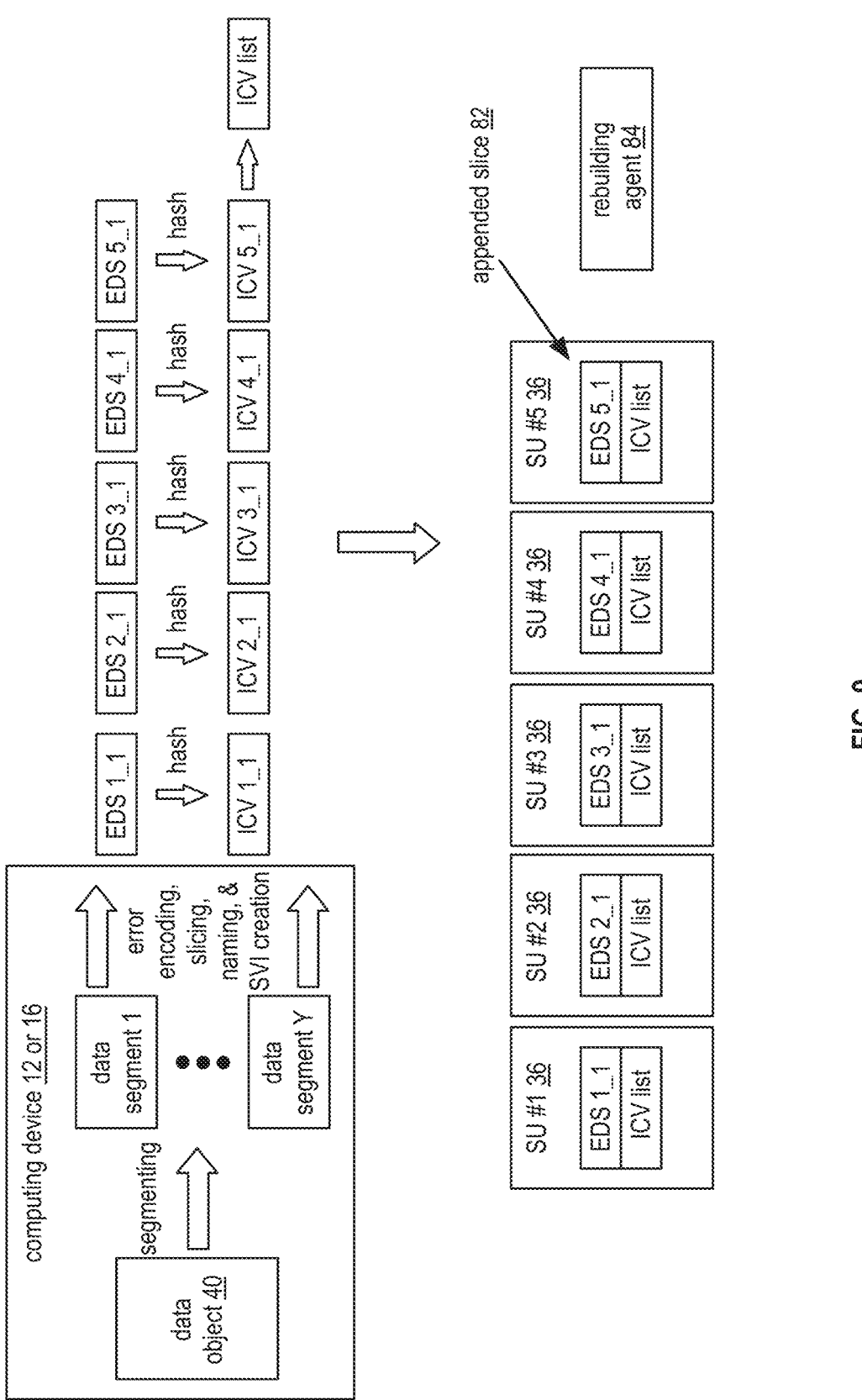
Figure 10:
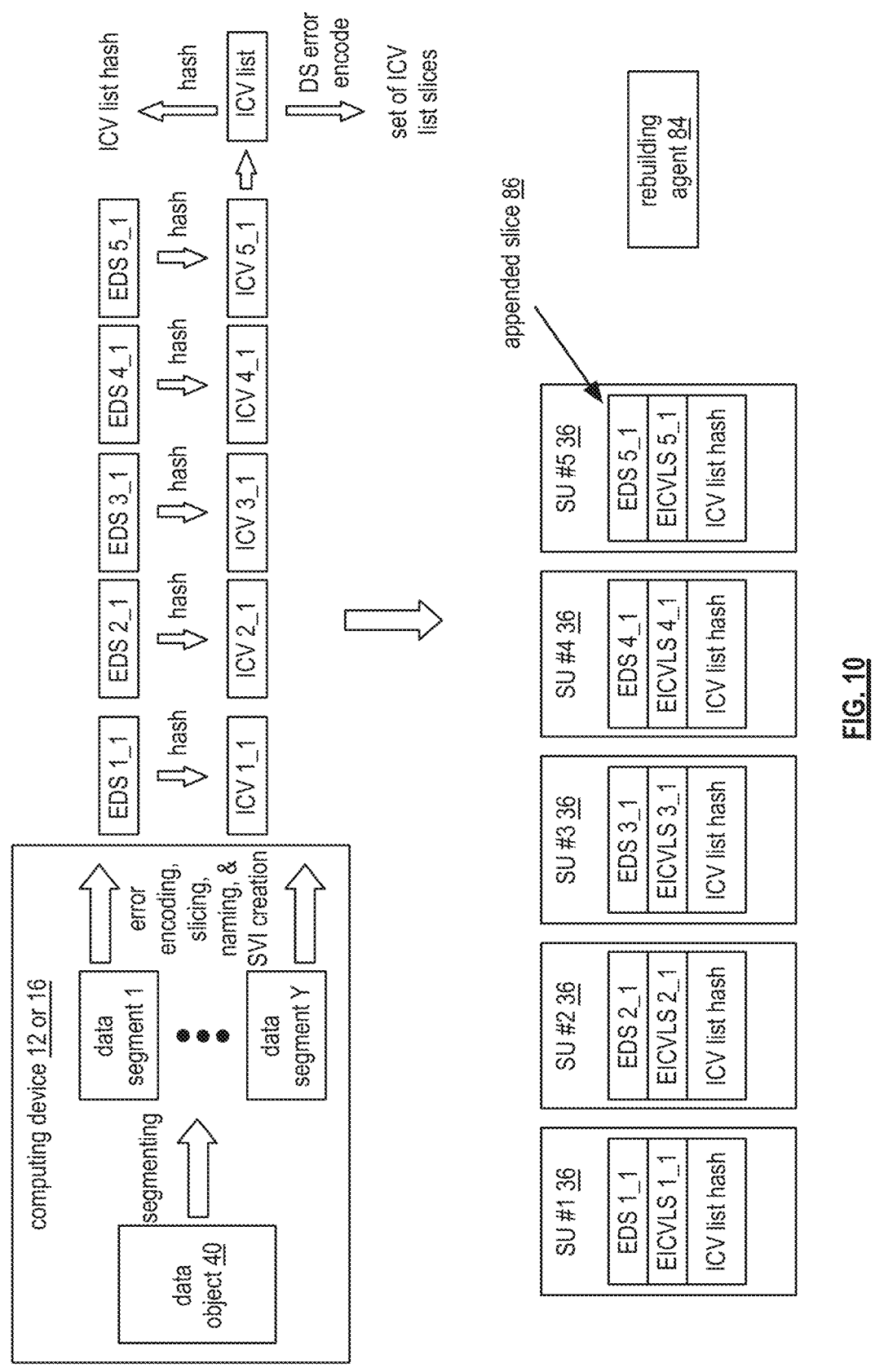

FIG. 9 schematic block diagram of an example of creating an appended slice of a set of appended encoded data slices in accordance with the present invention;

FIG. 10 is a schematic block diagram of another example of creating an appended slice of a set of appended encoded data slices in accordance with the present invention; and FIG. 11 is a logic diagram of an example of a method of embedding slice verification information into each encoded data slice of a set of encoded data slices to support verifiable rebuilding in accordance with the present invention.

DETAILED DESCRIPTION OF THE INVENTION

Figure 1:
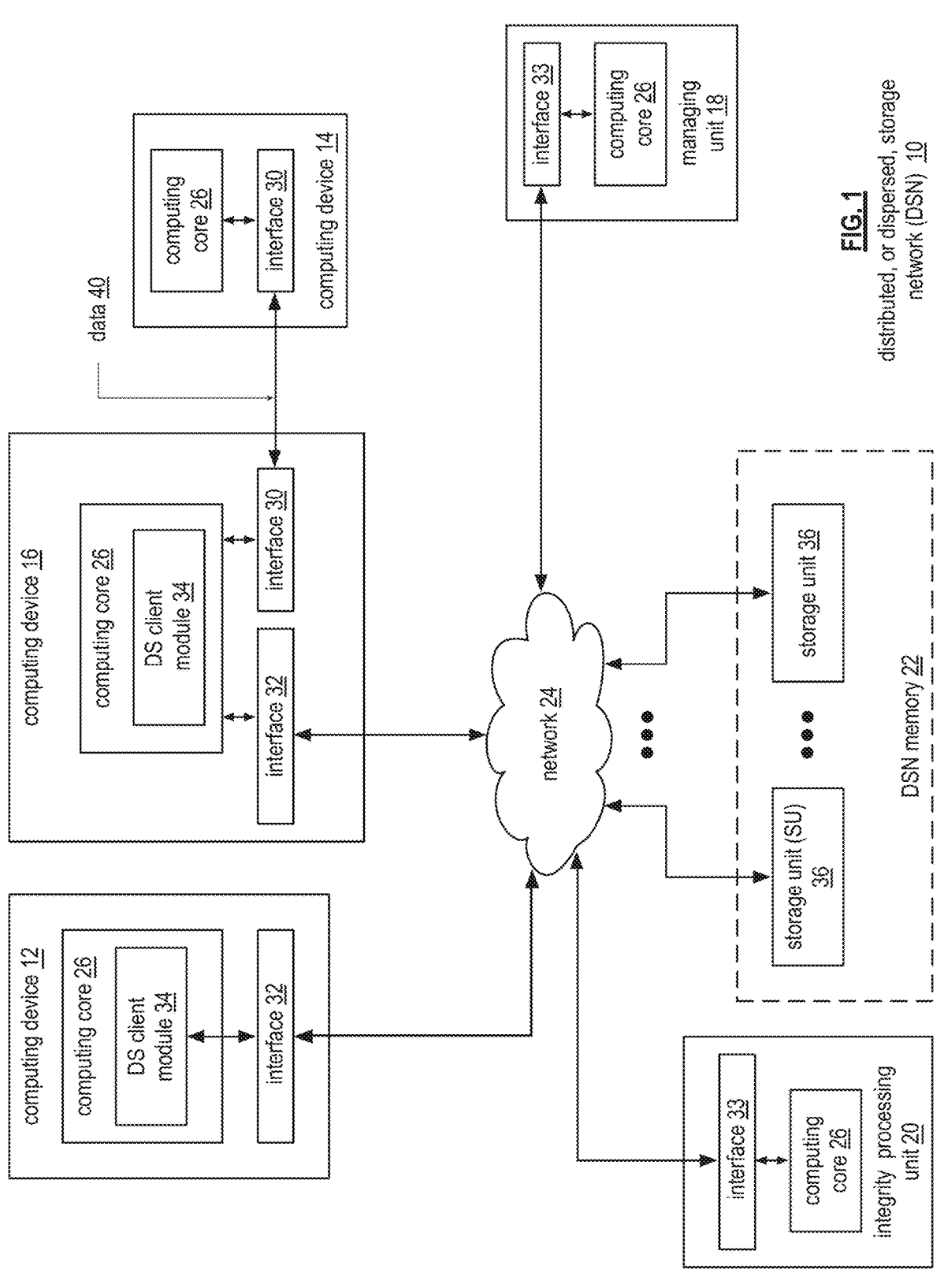
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
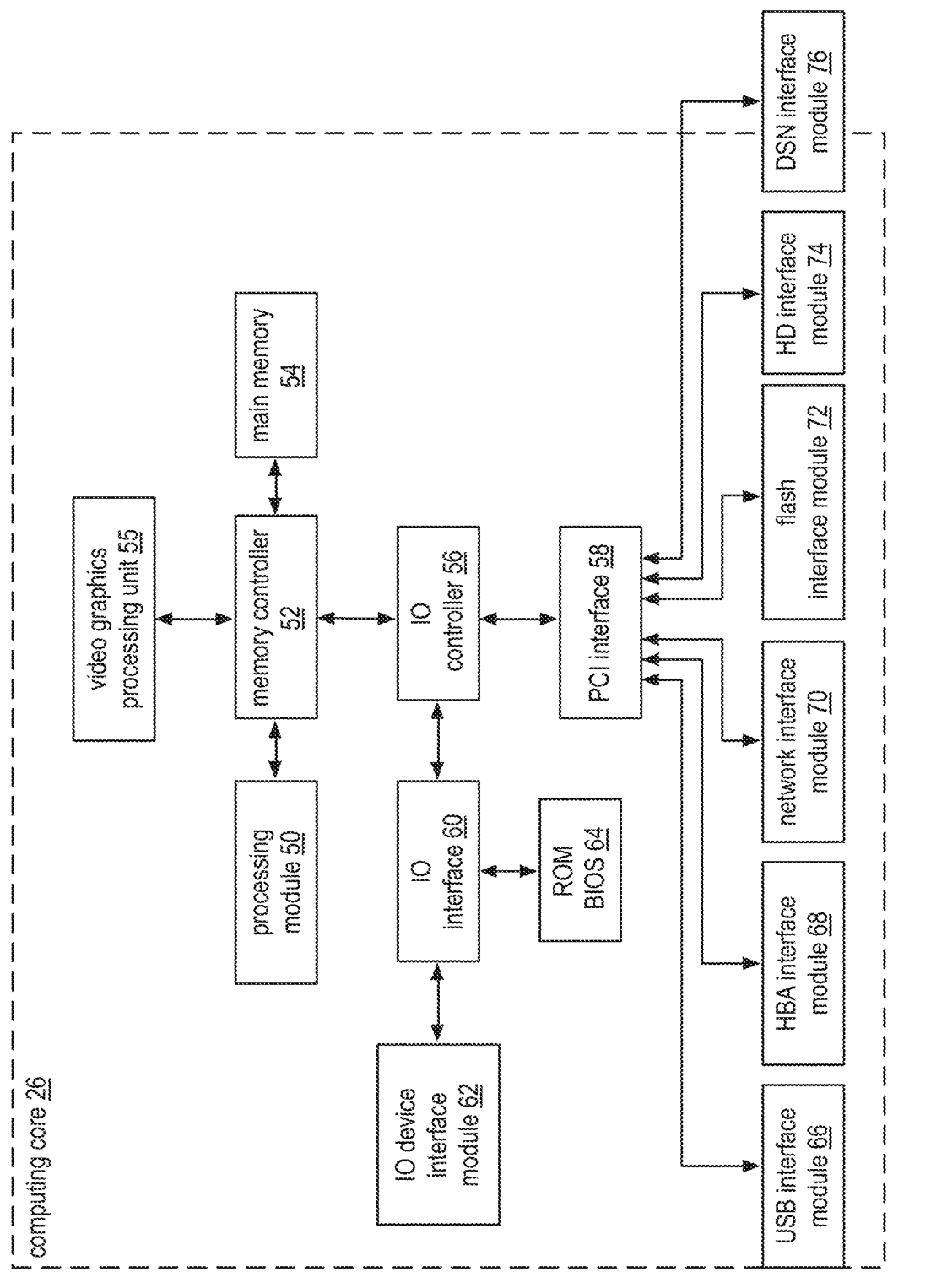
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 and 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data (e.g., data 40) as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The managing unit 18 creates billing information for a particular user, a user group, a vault access, public vault access, etc. For instance, the managing unit 18 tracks the number of times a user accesses a non-public vault and/or public vaults, which can be used to generate a per-access billing information. In another instance, the managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (ISCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4, 5, 6:
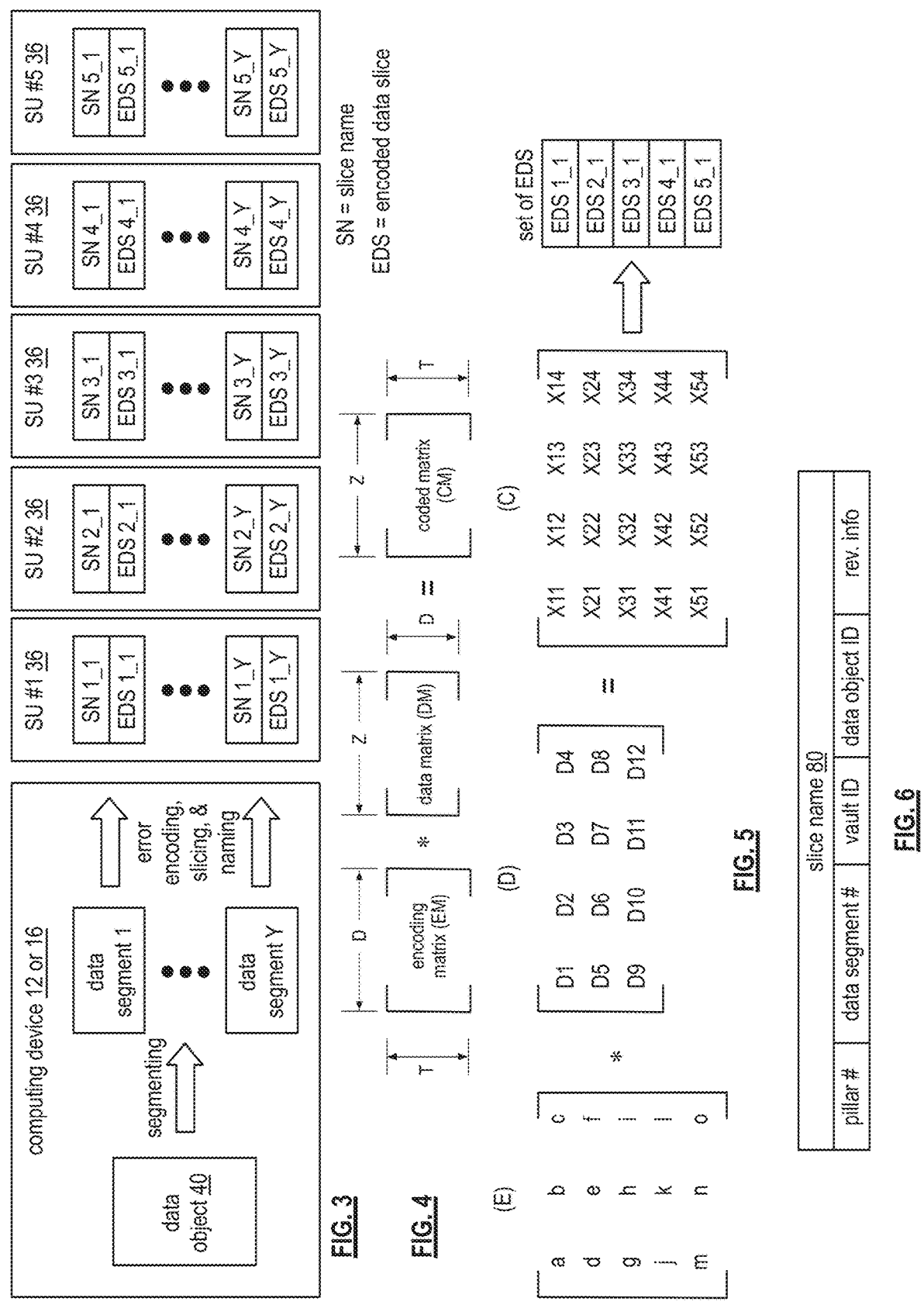
FIG. 3 is a schematic block diagram of an example of dispersed storage error encoding of data in accordance with the present invention.
FIG. 4 is a schematic block diagram of a generic example of an error encoding function in accordance with the present invention.
FIG. 5 is a schematic block diagram of a specific example of an error encoding function in accordance with the present invention.
FIG. 6 is a schematic block diagram of an example of a slice name of an encoded data slice (EDS) in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment (i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
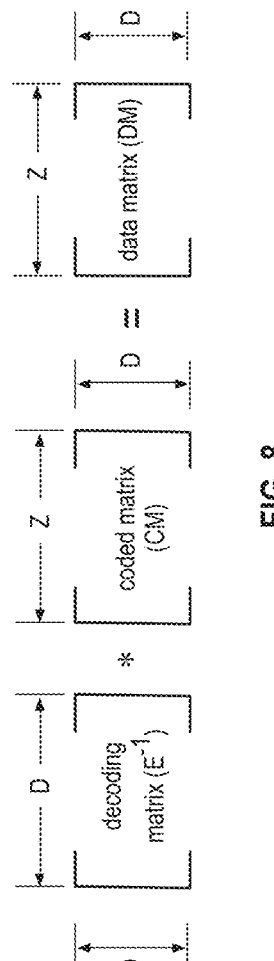
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

FIG. 9 is a schematic block diagram of an example of creating an appended slice of a set of appended encoded data slices. When a rebuilding agent 84 of a dispersed storage network (DSN) rebuilds lost slices on behalf of a storage unit 36 of a set of storage units that has lost and/or identified corrupted slices, the storage unit cannot necessarily assert that the slices it received from the rebuilding agent 84 are correct. For example, the storage unit does not know whether the rebuilding agent correctly rebuilt the slices, whether any network corruption or any other form of corruption occurred between sending and receipt of the rebuilt slices, whether the rebuilding agent performed integrity checks against the data source as a whole or the slices it received from other storage units to do the rebuild, whether other storage units participating in the rebuild did not supply corrupt slices (maliciously or accidentally) to subvert the proper rebuild of the slice, or whether the slice name and revision supplied for the rebuilt slice are the correct ones. These limitations can be overcome by embedding slice verification information (SVI) into each encoded data slice at the time of encoding to create an appended encoded data slice. Embedding slice verification information into each encoded data slice supports a secure and verifiable form of rebuilding which enables one entity to rebuild on behalf of another, while still permitting the storage unit that lost the slice to assert the correctness and validity of the rebuilt slice or slices it receives.

FIG. 9 depicts an example of a first embodiment of embedding slice verification information into each encoded data slice of a set of encoded data slices. FIG. 9 includes the computing device 12 or 16 of FIG. 3 which is operable to segment a data object 40 into data segments 1-Y. In addition to disperse storage error encoding a data segment of the data segments 1-Y using a selected encoding function (e.g., Cauchy Reed-Solomon) to produce a set of encoded data slices, the computing device 12 or 16 also generates slice verification information to be embedded into each slice. In this example, a data segment of the data segments 1-Y has been dispersed error encoded into a set of encoded data slices (EDS 1_1 through EDS 5_1). The computing device 12 or 16 also produces an integrity check value (ICV) for each encoded data slice of the set of encoded data slices to create a set of integrity check values (ICV 1_1 through ICV 5_1). For example, the computing device 12 or 16 uses a hash function on each encoded data slice of the set of encoded data slices to produce the set of integrity check values.

The computing device 12 or 16 then forms a list of the width number of integrity check values for each encoded data slice to produce and integrity check value list (e.g., the ICV list). The computing device 12 or 16 then affixes the ICV list to each encoded data slice of the set of encoded data slices to create a set of appended encoded data slices. The set of appended encoded data slices are then written out to the set of storage units 36. For example, storage unit #5 of the set of storage units stores an appended slice 82 where the appended slice 82 includes EDS 5_1 and the integrity check value list (ICV).

FIG. 10 is a schematic block diagram of another example of creating an appended slice of a set of appended encoded data slices. FIG. 10 depicts an example of a second embodiment of embedding slice verification information into each encoded data slice of a set of encoded data slices. FIG. 10 includes the computing device 12 or 16 of FIG. 3 that is operable to segment a data object 40 into data segments 1-Y. In addition to disperse storage error encoding a data segment of the data segments 1-Y using a selected encoding function (e.g., Cauchy Reed-Solomon) to produce a set of encoded data slices, the computing device 12 or 16 also generates slice verification information to be embedded into each slice. In this example, a data segment of the data segments 1-Y has been dispersed error encoded into a set of encoded data slices (EDS 1_1 through EDS 5_1). The computing device 12 or 16 also produces an integrity check value (ICV) for each encoded data slice of the set of encoded data slices to create a set of integrity check values (ICV 1_1 through ICV 5_1). For example, the computing device 12 or 16 uses a hash function on each encoded data slice of the set of encoded data slices to produce the set of integrity check values.

The computing device 12 or 16 then forms a list of the width number of integrity check values for each encoded data slice to produce an integrity check value list (e.g., the ICV list). The computing device 12 or 16 then preforms a hash function on the ICV list to create an ICV list hash. The computing device 12 or 16 also dispersed storage error encodes the ICV list to create a set of encoded ICV list slices (e.g., EICVLS 1_1 through EICVLS 5_1). For example, the computing device 12 or 16 puts the ICV list through the selected encoding function that was used to produce the set of encoded data slices to produce n slices with a threshold of k, where n is the number of slices produced for the original data segment, and k is the threshold used for the original data segment. For example, when using a 20-of-30 information dispersal algorithm (IDA) configuration to encode the data object 40, and when using an integrity check function with an output length of 16 bytes, first, a ICV list of 30*16 bytes is produced (480 bytes total). This 480 byte ICV list is then put through the 20-of-30 IDA to yield 30 ICV slices, each of which will be 480/20=24 bytes in size. Then a hash of the ICV list is computed, adding an additional 16 bytes or (24+16) total bytes of slice verification information. Compared to the approach of FIG. 9 where an IVC list is embedded with each encoded data slice, this example of storing an encoded ICV list slice and an IVC list hash reduces the storage overhead per slice from 480 bytes to just 40 bytes (using the 20-of-30 IDA example).

The computing device 12 or 16 then affixes the ICV list hash and an encoded ICV list slice to each encoded data slice of the set of encoded data slices to create a set of appended encoded data slices. The set of appended encoded data slices are then written out to the set of storage units 36. For example, storage unit #5 of the set of storage units stores an appended slice 86 where the appended slice 86 includes EDS 5_1, an encoded ICV list slice (EICVLS 5_1), and an ICV list hash.

FIG. 11 is a logic diagram of an example of a method of embedding slice verification information into each encoded data slice of a set of encoded data slices to support verifiable rebuilding. The method begins with step 88 where a set of storage units of a dispersed storage network (DSN) store a set of appended encoded data slices. As discussed previously with reference to FIGS. 9 and 10, a data segment of a data object is dispersed error encoded to produce the set of encoded data slices. An appended encoded data slice of the set of appended encoded data slices includes an encoded data slice of a set of encoded data slices and slice verification information that is regarding the set of encoded data slices. The slice verification information may include an integrity check value list. As discussed with reference to FIG. 9, the integrity check value list includes a width number equal to a number of integrity check values of a set of integrity check values, where each encoded data slice of the set of encoded data slices is hashed to produce the set of integrity check values.

Alternatively, the slice verification information may include an integrity check value list hash and an encoded integrity check value list slice of a set of encoded integrity check value list slices. As discussed with reference to FIG. 10, the integrity check value list is hashed to produce the integrity check value list hash and the integrity check value list is dispersed error encoded to produce the set of encoded integrity check value list slices.

The method continues with step 90 where a rebuilding agent of the DSN identifies one of the set of appended encoded data slices for rebuilding. For example, the rebuilding agent identifies an appended encoded data slice stored in a storage unit of a set of storage units that has been lost or corrupted. The method continues with step 92 where the rebuilding agent rebuilds the encoded data slice of the one of the set of appended encoded data slices based on a decode threshold number of appended encoded data slices of the set of appended encoded data slices. The method continues with step 94 where the rebuilding agent generates current slice verification information for the rebuilt encoded data slice.

To generate the current slice verification information for the rebuilt encoded data slice, the rebuilding agent must determine which type of slice verification information was used (e.g., the integrity check value list or the integrity check value list hash and encoded integrity check value list slice). For example, the rebuilding agent may send a slice verification information inquiry to the DS processing unit (e.g., computing device 12 or 16) that generated the set of appended encoded data slices to determine which type of slice verification information was used. Alternatively, the rebuilding agent may perform a trusted source lookup to determine which type of slice verification information was used. A trusted source lookup would require the rebuilding agent to use a certificate of authenticity to access the information via a lookup.

Once the type of slice verification information is determined, the rebuilding agent must generate the current slice verification information in the same way the slice verification information was created. When the rebuilding agent determines that the slice verification information is the integrity check value list, the rebuilding agent will generate a current integrity check value list. A current integrity check value list includes a width number equal to a number of current integrity check values of a set of current integrity check values, where each encoded data slice of an appended encoded data slice of the decode threshold number of appended encoded data slices and the rebuilt encoded data slice is hashed to produce the current set of integrity check values.

In addition, when the current slice verification information is the encoded integrity check value list slice and ICV list hash, the storage unit may request encoded integrity check value list slices and ICV list hashes from at least a threshold number of other storage units of the DSN. A majority agreement of the ICV list hash among the at least the threshold number of other storage units authenticates the ICV list hash. The storage unit decodes the ICV list from the threshold number of encoded integrity check value list slices and compares the decoded ICV list and authenticated ICV list hash. The storage unit then checks the rebuilt encoded data slice against the ICV in the ICV list. Alternatively, the storage unit does not have to communicate with the other storage units to verify the current slice verification information if the rebuilding agent obtains a digital signature from a threshold number of storage units involved in the rebuild. Along with the appended rebuilt encoded data slice, the rebuilding agent sends the digital signatures to the storage unit so the storage unit can trust the rebuild.

The method continues with step 96 where the rebuilding agent sends an appended rebuilt encoded data slice that includes the rebuilt encoded data slice and the current slice verification information (e.g., the current integrity check value list or the current integrity check value list and current encoded integrity check value list slice) to a storage unit of the set of storage units. The method continues with step 98 where the storage unit verifies that the current slice verification information corresponds to the slice verification information. For example, the storage unit may compare the current slice verification information and the slice verification information. To do this, the slice verification must have been saved (by the storage unit or another device of the DSN) separately from the corrupt or lost appended encoded data slice. Alternatively, the storage unit may perform a deterministic function on the current slice verification information to determine that it corresponds to the slice verification information.

When the current slice verification information corresponds to the slice verification information, the method continues to step 100 where the storage unit stores the appended rebuilt encoded data slice as a trusted rebuilt encoded data slice. When the current slice verification information does not correspond to the slice verification information, the method continues to step 102 where the storage unit indicates an authenticity failure of the rebuild of the appended encoded data slice.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more computing devices of a storage network, the method comprises:
rebuilding an appended encoded data slice of a set of appended encoded data slices based on:
utilizing a decode threshold number of appended encoded data slices of a set of appended encoded data slices stored in a set of storage units of the storage network to produce a rebuilt encoded data slice for inclusion in the appended encoded data slice; and
generating current slice integrity check value information for inclusion in a rebuilt appended encoded data slice of the set of appended encoded data slices, wherein an appended encoded data slice of the set of appended encoded data slices includes an encoded data slice of a set of encoded data slices and slice integrity check value information for the encoded data slice;
determining the current slice integrity check value information compares favorably to the slice integrity check value information to produce a trusted rebuilt appended encoded data slice; and
when the current slice integrity check value information compares favorably to the slice integrity check value information, storing the rebuilt appended encoded data slice as the trusted rebuilt appended encoded data slice.

2. The method of claim 1, wherein the slice integrity check value information comprises:
an integrity check value list, wherein the integrity check value list includes a width number equal to a number of integrity check values of a set of integrity check values.

3. The method of claim 2, wherein each encoded data slice of the set of encoded data slices is hashed to produce the set of integrity check values.

4. The method of claim 1, wherein the slice integrity check value information comprises:
an integrity check value list hash, wherein an integrity check value list is hashed to produce the integrity check value list hash.

5. The method of claim 4, wherein the slice integrity check value information further comprises:
an encoded integrity check value list slice of a set of encoded integrity check value list slices, wherein the integrity check value list is error encoded to produce the set of encoded integrity check value list slices.

6. The method of claim 1, wherein the storing the rebuilt appended encoded data slice comprises:
sending the rebuilt appended encoded data slice that includes a rebuilt encoded data slice and the current slice integrity check value information to a storage unit of the set of storage units.

7. The method of claim 1, wherein the generating the current slice integrity check value information for the rebuilt appended encoded data slice further comprises:
determining whether the slice integrity check value information is an integrity check value list or an integrity check value list hash and an encoded integrity check value list slice.

8. The method of claim 7 further comprises:
when the slice integrity check value information is the integrity check value list:
generating a current integrity check value list, wherein the current integrity check value list includes a width number equal to a number of current integrity check values of a set of current integrity check values, wherein each encoded data slice associated with a decode threshold number of appended encoded data slices of the set of appended encoded data slices and the rebuilt appended encoded data slice is hashed to produce a set of current integrity check values.

9. The method of claim 7 further comprises:
when the slice integrity check value information is the integrity check value list hash and the encoded integrity check value list slice:
generating a current integrity check value list;
hashing the current integrity check value list to produce a current integrity check value list hash; and
dispersed error encoding the current integrity check value list to produce a set of current encoded integrity check value list slices.

10. The method of claim 7, wherein the determining whether the slice integrity check value information is the integrity check value list or the integrity check value list hash and the encoded integrity check value list slice comprises:
sending a slice integrity check value information inquiry to a processing unit of the storage network that generated the set of appended encoded data slices.

11. The method of claim 7, wherein the determining whether the slice integrity check value information is the integrity check value list or the integrity check value list hash and the encoded integrity check value list slice comprises:
performing a trusted source lookup.

12. The method of claim 1, wherein the determining the current slice integrity check value information corresponds to the slice integrity check value information comprises:
comparing the current slice integrity check value information to the slice integrity check value information.

13. The method of claim 1, wherein the determining the current slice integrity check value information corresponds to the slice integrity check value information comprises:
performing a deterministic function on the current slice integrity check value information.

14. The method of claim 1, wherein the rebuilding further comprises:
obtaining the decode threshold number of appended encoded data slices of the set of appended encoded data slices; and
rebuilding the appended encoded data slice based on the decode threshold number of appended encoded data slices.

15. The method of claim 1 further comprises:
when the current slice integrity check value information does not compare favorably to the slice integrity check value information, indicating an authenticity failure of the rebuilding of the appended encoded data slice.

16. A computer readable storage device comprises:
at least one memory section for storing operational instructions that, when executed by one or more computing devices of a storage network, cause the one or more computing devices to:
rebuild an appended encoded data slice of a set of appended encoded data slices based on:
utilizing a decode threshold number of appended encoded data slices of a set of appended encoded data slices stored in a set of storage units of the storage network to produce a rebuilt encoded data slice for inclusion in the appended encoded data slice; and generating current slice integrity check value information for inclusion in a rebuilt appended encoded data slice of the set of appended encoded data slices, wherein an appended encoded data slice of the set of appended encoded data slices includes an encoded data slice of a set of encoded data slices and slice integrity check value information for the encoded data slice;

determine the current slice integrity check value information compares favorably to the slice integrity check value information to produce a trusted rebuilt appended encoded data slice; and when the current slice integrity check value information compares favorably to the slice integrity check value information, store the rebuilt appended encoded data slice as the trusted rebuilt appended encoded data slice.

17. The computer readable storage device of claim 16, wherein the slice integrity check value information comprises:

an integrity check value list, wherein the integrity check value list includes a width number equal to a number of integrity check values of a set of integrity check values.

18. The computer readable storage device of claim 17, wherein each encoded data slice of the set of encoded data slices is hashed to produce the set of integrity check values.

19. The computer readable storage device of claim 15, wherein the slice integrity check value information comprises:

an integrity check value list hash, wherein an integrity check value list is hashed to produce the integrity check value list hash.

* * * * *